(12) United States Patent
Chen (10) Patent No.: US 8,040,974 B2
(45) Date of Patent: Oct. 18, 2011

(54) SHIFT SPACE-TIME CODING FOR DIGITAL VIDEO BROADCASTING SYSTEMS

(75) Inventor: Ching-Yung Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1042 days.

(21) Appl. No.: 11/907,152

(22) Filed: Oct. 10, 2007

(65) Prior Publication Data
US 2008/0123752 A1     May 29, 2008

Related U.S. Application Data

(60) Provisional application No. 60/861,425, filed on Nov. 29, 2006.

(51) Int. Cl.
*H04L 27/36* (2006.01)
(52) U.S. Cl. ........................ 375/298; 375/299
(58) Field of Classification Search .............. 375/146, 375/203, 219, 240, 242, 259, 260, 265, 267, 375/295, 298, 299, 316, 341
See application file for complete search history.

(56) References Cited

U.S. PATENT DOCUMENTS

| | | | | |
|---|---|---|---|---|
| 7,430,243 B2 * | 9/2008 | Giannakis et al. | | 375/267 |
| 7,460,607 B2 * | 12/2008 | van Rooyen et al. | | 375/265 |
| 7,471,742 B2 * | 12/2008 | Hammons, Jr. | | 375/299 |
| 2005/0157806 A1 * | 7/2005 | Walton et al. | | 375/267 |
| 2007/0002724 A1 * | 1/2007 | Khan | | 370/203 |
| 2008/0181319 A1 * | 7/2008 | Kao et al. | | 375/260 |
| 2010/0111065 A1 * | 5/2010 | Noh et al. | | 375/260 |

OTHER PUBLICATIONS

King F. Lee et al., "A Space-Time Coded Transmitter Diversity Technique for Frequency Selective Fading Channels", 0-7803-6339-6/00 2000 IEEE, pp. 149-152.
Siavash M. Alamouti, "A Simple Transmit Delivery Technique for Wireless Communications", IEEE Journal on Select Areas in Communications, vol. 16, No. 8, Oct. 1998.

* cited by examiner

*Primary Examiner* — Pao Sinkantarakorn
*Assistant Examiner* — Phuongchau B Nguyen
(74) *Attorney, Agent, or Firm* — Finnegan, Henderson, Farabow, Garrett & Dunner, LLP (57) ABSTRACT

A shift space-time encoding scheme applies STBC over hierarchical modulation. A low-priority bit stream is modulated to complex symbols using STBC encoding and a high-priority bit stream is modulated to complex symbols without STBC encoding. Complex symbols from the low-priority bit stream together with the complex symbols from the high-priority bit stream are added to form a hierarchical 64-QAM constellation.

19 Claims, 6 Drawing Sheets

- HP: 16-QAM detector (backward compatible)

$r[0] = h_1 \cdot y_1[0] + h_2 \cdot y_2[0]$
$= (h_1 + h_2) \cdot s_{HP}[0] + h_1 \cdot s_{LP,1}[0] + h_2 \cdot s_{LP,2}[0] + w[0]$ $r[1] = h_1 \cdot y_1[1] + h_2 \cdot y_2[1]$
$= (h_1 + h_2) \cdot s_{HP}[1] + h_1 \cdot s_{LP,1}[1] + h_2 \cdot s_{LP,2}[1] + w[1]$

- LP: Shift-space-time decoder

$\tilde{r}[0] = r[0] - (h_1 + h_2) \cdot s_{HP}[0] = h_1 \cdot s_{LP,1}[0] + h_2 \cdot s_{LP,2}[0] + w[0]$ Space-time decoding with diversity gain $\tilde{r}[1] = r[1] - (h_1 + h_2) \cdot s_{HP}[1] = h_1 \cdot s_{LP,1}[1] + h_2 \cdot s_{LP,2}[1] + w[1]$ Demodulation of HP and LP components

SHIFT SPACE-TIME CODING FOR DIGITAL VIDEO BROADCASTING SYSTEMS

RELATED APPLICATIONS

This application is based upon and claims the benefit of priority from Provisional Application No. 60/861,425, filed Nov. 29, 2006, the entire contents of which are incorporated herein by reference.

TECHNICAL FIELD

The present invention generally relates to digital broadcasting systems and, more particularly, to shift space-time coding for digital broadcasting systems.

BACKGROUND

In digital communication systems and digital broadcasting systems, a signal is transmitted as an electromagnetic waveform through a physical channel, such as air, to receivers. A channel effect may occur, which is not ideal. Undesired channel effects may include multipath reflection and propagation fading, leading to signal distortion. To address the channel fading phenomenon, a conventional approach has been proposed, which employs a transmit diversity technology. This approach includes, for example, multiple transmitting antennas, such that if a signal received from one transmitter antenna is in a deep fade, a stronger signal is able to be received from a different transmitter antenna in order to maintain communication. It is more practical to implement transmit diversity technology, by adding components at a base station than to implement receive diversity technology, which would require additional components at the remote receiving units, increasing their cost and size.

One example of the conventional approach is space-time block code ("STBC"), which has been discussed, for example, by Alamouti in "A Simple Transmit Diversity Technique for Wireless Communications," IEEE Journal on Selected Areas in Communications, vol. 16, pp. 1451-1458 (October 1998). Transmit diversity has been a key technology adopted by modern communication systems in order to improve the system performance, such as data rate and reliability. Alamouti describes a simple transmit diversity scheme for improving the signal quality at the receiver side by simple processing across two transmit antennas on the transmitting side. The obtained diversity order is equal to applying maximal-ratio receiver combining (MRRC) with two antennas at the receiver. The scheme described by Alamouti may be generalized to two transmit antennas and M receive antennas to provide a diversity order of 2M.

Figure 1:
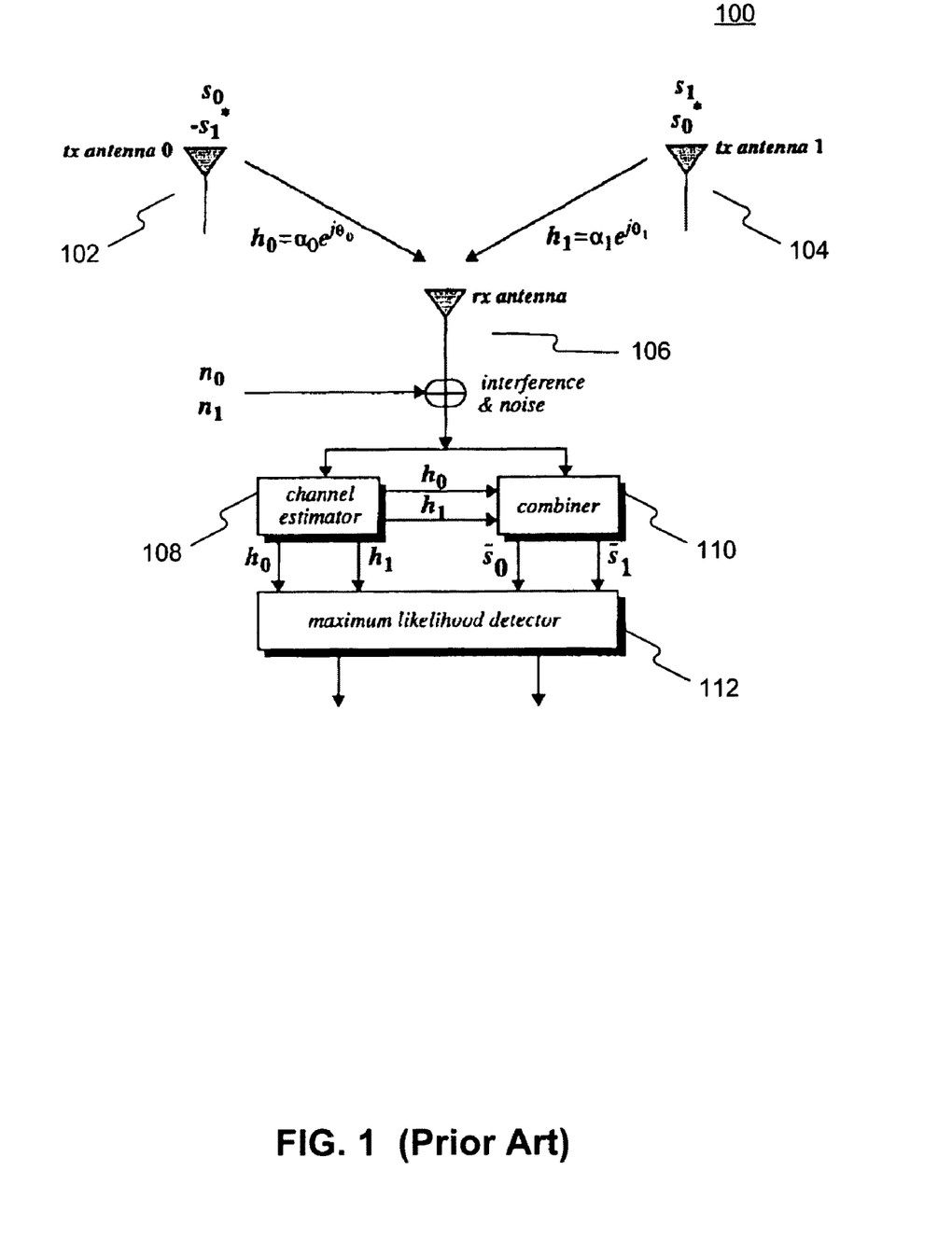
FIG. 1 shows a conventional space-time block coding technology.
Figure 2:
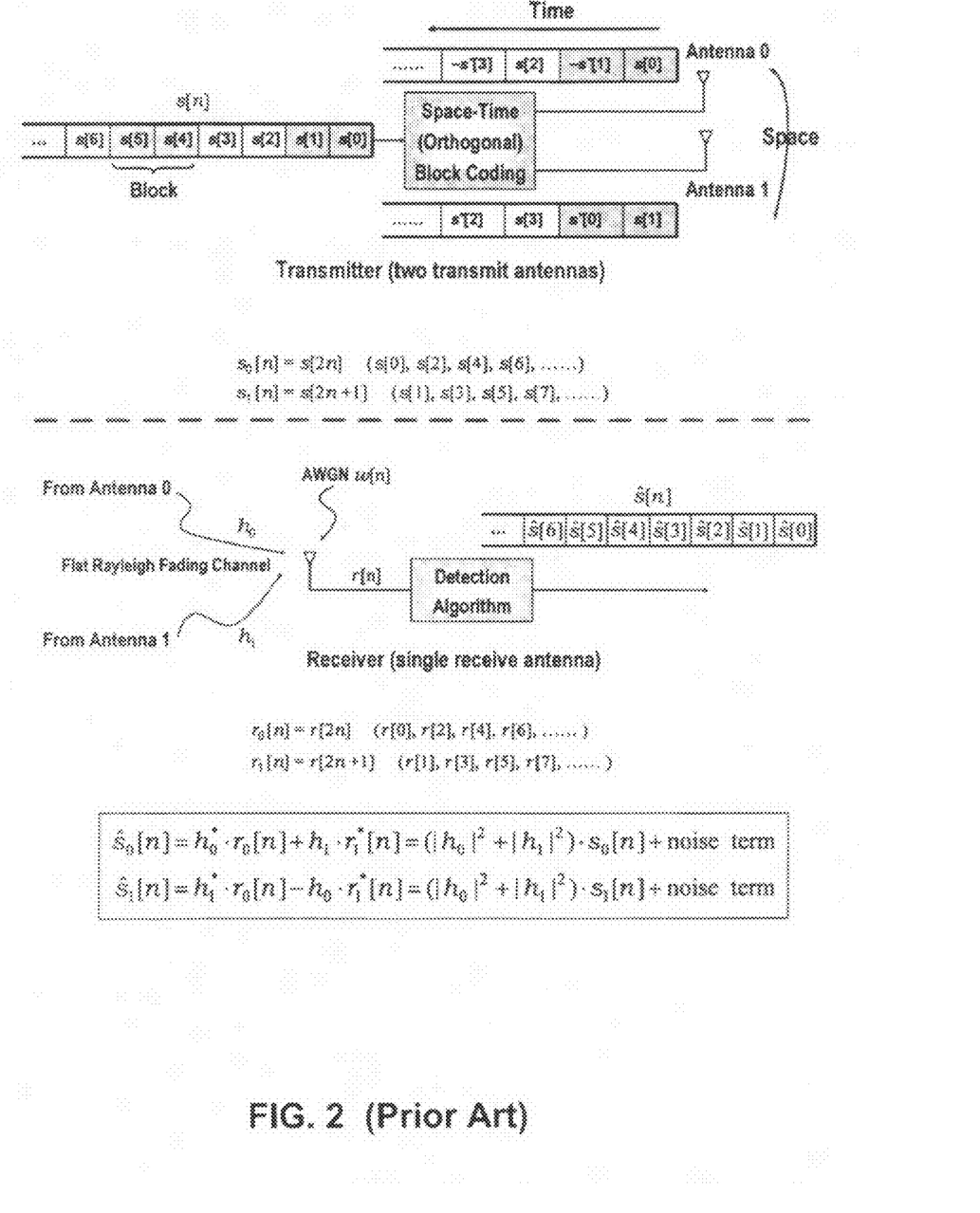
FIG. 2 shows a block diagram illustrating the space-time block coding technology, related to FIG. 1.

For example, FIGS. 1 and 2 illustrate a space-time block coding technology according to Alamouti. FIG. 1 illustrates the baseband representation of the two-branch transmit diversity scheme 100 disclosed by Alamouti. The scheme incorporates two transmit antennas (102, 104) and one receive antenna (106). The scheme disclosed by Alamouti may be defined by three functions: (1) the encoding and transmission sequence of information symbols at the transmitter; (2) the combining scheme at the receiver; and (3) the decision rule for maximum likelihood detection.

Regarding the encoding and transmission sequence of information symbols at the transmitter function, at a given symbol period, two signals are simultaneously transmitted from the two antennas. The signal transmitted from antenna zero is denoted by $s_0$ and from the antenna one by $s_1$. During the next symbol period signal $(-s_1^*)$ is transmitted from antenna zero, and signal $s_0^*$ is transmitted from antenna one where * is the complex conjugate operation. As shown in Table I, the encoding is performed in space and time (space-time coding). The encoding, however, may also be performed in space and frequency. Instead of two adjacent symbol periods, two adjacent carriers may be used (space-frequency coding).

As shown in Table I, the channel at time t may be modeled by a complex multiplicative distortion $h_0(t)$ for the transmit antenna zero (102) and $h_1(t)$ for transmit antenna one (104).

TABLE I

|  | antenna zero | antenna one |
|---|---|---|
| time t | $s_0$ | $s_1$ |
| time t + T | $-s_1^*$ | $s_0^*$ |

Assuming that fading is constant across two consecutive symbols, it can be formulated:

$$h_0(t)=h_0(t+T)=h_0=\alpha_0 e^{j\theta_0}$$

$$h_1(t)=h_1(t+T)=h_1=\alpha_1 e^{j\theta_1} \quad (\text{Eq. 1})$$

where T is the symbol duration. The received signals can then be expressed as:

$$r_0=r(t)=h_0 s_0 + h_1 s_1 + n_0$$

$$r_1=r(t+T)=-h_0 s_1^* + h_1 s_0^* + n_1 \quad (\text{Eq. 2})$$

where $r_0$ and $r_1$ are the received signals at time t and t+T and $n_0$ and $n_1$ are complex random variables representing receiver noise and interference.

Regarding the combining scheme at the receiver function, the combiner 110 shown in FIG. 1 in communication with channel estimator 108, builds the following two combined signals that are input to the maximum likelihood detector 112:

$$\tilde{s}_0 = h_0^* r_0 + h_1 r_1^*$$

$$\tilde{s}_1 = h_1^* r_0 - h_0 r_1^* \quad (\text{Eq. 3})$$

Substituting (Eqs. 1 and 2) into Eq. 3, yields:

$$\tilde{s}_0 = (\alpha_0^2 + \alpha_1^2) s_0 + h_0^* n_0 + h_1 n_1^*$$

$$\tilde{s}_1 = (\alpha_0^2 + \alpha_1^2) s_1 h_0 n_1^* + h_1^* n_0 \quad (\text{Eq. 4})$$

Regarding the maximum likelihood decision rule, the combined signals in Eq. 4 are then sent to the maximum likelihood detector 112, which, for each signals $s_0$ and $s_1$, uses a decision rule depending on a constellation which describes the mapping from information bits to complex symbols. The resulting combined signals in Eq. 4 are equivalent to that obtained from two branch MRRC (maximal-ratio receiver combining). The only difference between the resulting combined signals and the one obtained from two branch MRRC is phase rotations on the noise components, which do not degrade the effective signal to noise ration (SNR). Thus, the resulting diversity order from the new two-branch transmit diversity scheme with one receiver is equal to that of two-branch MRRC. Therefore, full diversity may be obtained by implementing Alamouti's STBC (space-time block code) approach. However, Alamouti's approach is based on the assumption of flat-fading channel and on the assumption that channel state information is known by receivers.

An approach discussed by Lee and Williams in "A Space-Time Transmitter Diversity Technique for Frequency Selective Fading Channels," Proc. IEEE Sensor Array and Multi-channel Signal Processing Workshop, Mar. 16-17, 2000, pp. 149-152 proposes a multiple-input multiple-output orthogonal frequency division multiplexing (MIMO-OFDM) scheme by combining Alamouti's space-time block coding (STBC) with multicarrier modulation. The scheme proposed by Lee and Williams may be used for both flat-fading and frequency selective fading channels.

Lee and Williams describe the simple transmitter diversity scheme proposed by Alamouti as adapted to an OFDM system, illustrating effectiveness of space-time OFDM, and achieving diversity gain over frequency selective fading channels. A block diagram 300 of the two-branch space-time OFDM transmitter diversity system disclosed by Lee and William is shown in FIG. 3.

Figure 3:
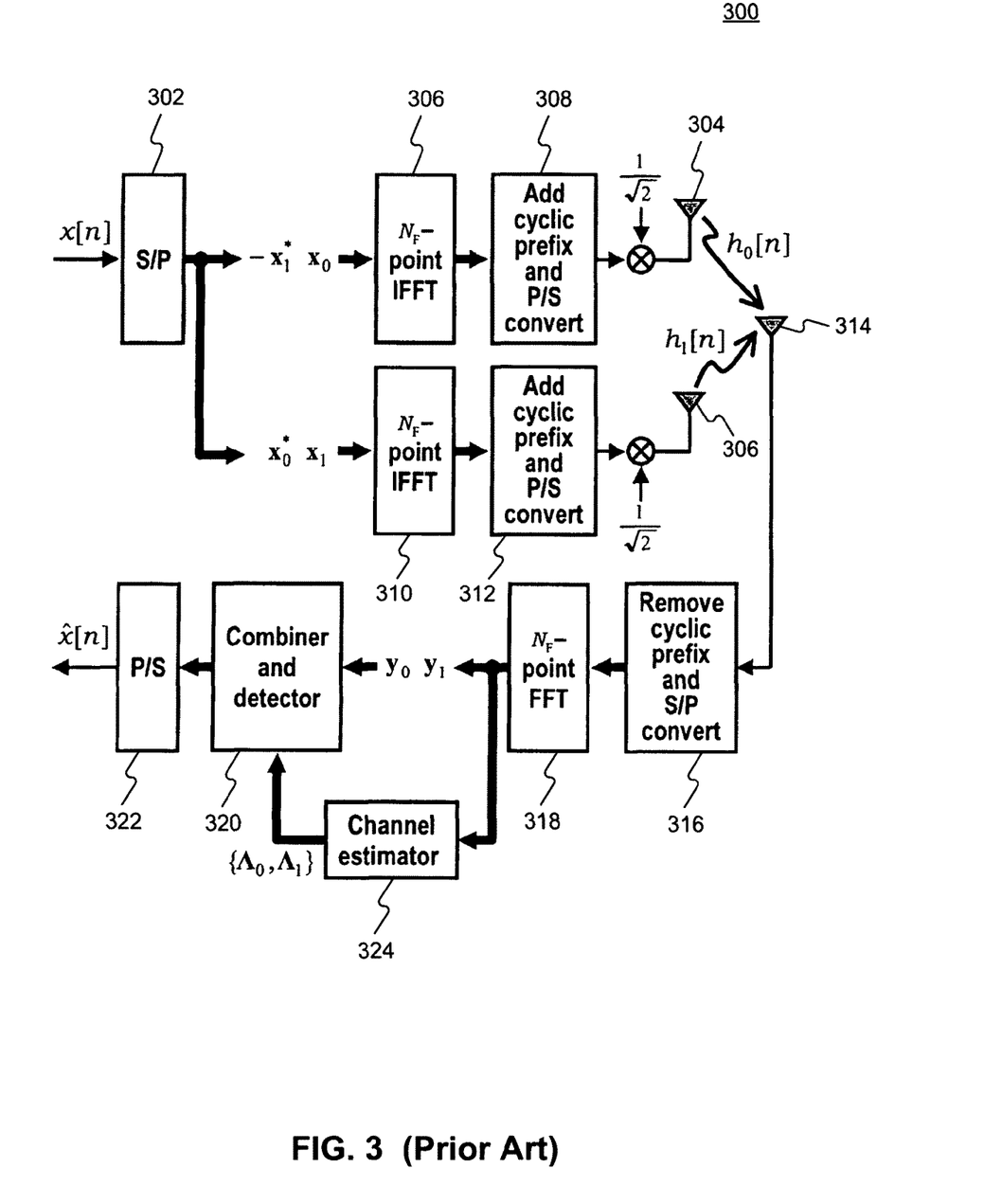
FIG. 3 illustrates a block diagram of a conventional two-branch space-time OFDM transmitter diversity system.

FIG. 3 illustrates successive data symbol vectors at the output of the serial to parallel converter 302. These successive data symbol vectors may be considered one pair at a time. FIG. 3 illustrates the first vector in the pair as odd vector $x_0$ and the second in the pair as the even vector $x_1$. If $x_1$ is the M-th block data symbol vector and $x_1$ is the (M+1)-th block vector, they may be defined as:

$$x_0 = [X(MN) \ldots X(MN+N-1)]^T$$

$$x_1 = [X(MN+N) \ldots X(MN+2N-1)]^T \quad \text{(Eq. 5)}$$

At the first transmitter 304, $x_0$ is transmitted through IFFT (Inverse Fast Fourier Transform) block 306 and cyclic prefix addition block 308, during the first time slot followed by $-x_1^*$ in the second time slot. At the second transmitter, $x_1$ is transmitted first through IFFT (Inverse Fast Fourier Transform) block 310 and cyclic prefix addition block 312 followed by $x_0^*$. The equivalent space-time block code transmission matrix may be expressed as:

$$G_2 = \begin{pmatrix} x_0 & x_1 \\ -x_1^* & x_0^* \end{pmatrix}$$

Thus, the entries of the transmission matrix are the OFDM symbol vectors, $x_0$ and $x_1$, and their conjugates.

Letting $\Lambda_0$ and $\Lambda_1$ (shown in FIG. 3 as outputs of channel estimator 324) be two diagonal matrices whose diagonal elements are the discrete Fourier transforms (DFTs) of the respective channel impulse responses, $h_0$ and $h_1$. Assuming that the channel responses are constant during the two time slots, the demodulated vectors in the corresponding time slots are determined as:

$$Y_0 = \Lambda_0 X_0 + \Lambda_1 X_1 + Z_0$$

$$Y_1 = -\Lambda_0 X_1^* + \Lambda_1 X_0^* + Z_1 \quad \text{(Eq. 6)}$$

Assuming the channel responses are known or can be estimated at the receiver 314, the decision variables are constructed by combining $Y_0$, $Y_1$ (shown in FIG. 3 as outputs of cyclic prefix removal block 316 and point Fast Fourier Transform (FFT) block 318), and the channel response matrices as $$\hat{X}_0 = \Lambda_0^* Y_0 + \Lambda_1 Y_1^*$$

$$\hat{X}_1 = \Lambda_1^* Y_0 - \Lambda_0 Y_1^* \quad \text{(Eq. 7)}$$

Substituting Eq. 6 into Eq. 7 yields:

$$\hat{X}_0 = (|\Lambda_0|^2 + |\Lambda_1|^2) X_0 + \Lambda_0^* Z_0 + \Lambda_1 Z_1^*$$

$$\hat{X}_1 = (|\Lambda_0|^2 + |\Lambda_1|^2) X_1 + \Lambda_1^* Z_0 + \Lambda_0 Z_1^* \quad \text{(Eq. 8)}$$

Wherein $\hat{X}[n]$ represents the output of the combiner and detector 320 and parallel to serial converter 322. These decision equations for the transmit diversity scheme 300 proposed by Lee and Williams are similar in form to that of a two-branch MRC receiver diversity system.

The transmit diversity technology described above was not adopted by any existing digital video/audio broadcasting systems, such as the Digital Video Broadcasting-Terrestrial (DVB-T), Digital Video Broadcasting-Handheld (DVB-H), and Integrated Services Digital Broadcasting-Terrestrial (ISDB-T) systems, because these standards were disseminated before the development of the transmit diversity technology. Thus, the performance of the DAB, ISDB-T, DVB-T, and DVB-H is limited, due to the single-transmit antenna structure scheme.

For a point-to-multipoint service in the application of digital video/audio broadcasting, transmit diversity technology achieves the best efficacy because all subscribers simultaneously enjoy improved performance at the cost of a small investment at the base station. However, present transmit diversity technologies (including the STBC schemes mentioned above) are not compatible with single transmit antenna structures. As a result, existing receivers may not be able to function properly if a transmit diversity technology is adopted by the transmitter of an existing broadcasting system.

Thus, there is a need for a scheme introducing the transmit diversity technology to existing digital video/audio broadcasting systems with backward compatibility to existing receivers.

SUMMARY

Embodiments consistent with the present invention provide for shift space-time coding (SSTC) for digital video broadcasting systems. In one aspect, there is provided a shift space-time coding (SSTC) system for digital broadcasting, including a first SSTC component and a second SSTC component. The first SSTC component includes a first channel encoder having an input receiving a high-priority bit stream and an output supplying a first channel-encoded bit stream. The first SSTC component also includes a QAM symbol mapper having an input receiving the first channel-encoded bit stream and an output supplying a QAM-modulated symbol sequence. The first SSTC component further includes a first adder having a first input receiving the QAM-modulated symbol sequence, a second input; and an output supplying a first shift space-time-encoded symbol sequence.

The second SSTC component includes a second channel encoder having an input receiving a low-priority bit stream and an output supplying a second channel-encoded bit stream; an STBC encoder having an input receiving the second channel-encoded bit stream and two outputs supplying a first STBC-modulated symbol sequence to the second input of the first adder and a second STBC-modulated symbol sequence; and a second adder including a first input receiving the second STBC-modulated symbol sequence, a second input receiving the QAM-modulated symbol sequence; and an output supplying a second shift space-time-encoded symbol sequence.

Embodiments consistent with the present invention also provide a method for providing shift space-time coding (SSTC) bit streams for digital broadcasting, the method comprising: receiving a high-priority bit stream, encoding the high-priority bit stream to form a first channel-encoded bit stream, mapping the first channel-encoded bit stream into complex symbols to form a QAM-modulated symbol sequence, receiving a low-priority bit stream, encoding the low-priority bit stream to form a second channel-encoded bit stream, performing STBC-encoding on the second channel-encoded bit stream to form a first STBC-modulated symbol sequence and a second STBC-modulated symbol sequence, adding the first STBC-modulated symbol sequence to the QAM-modulated symbol sequence to form a first shift space-time-encoded symbol sequence, and adding the QAM-modulated symbol sequence to the second STBC-modulated symbol sequence to form a second shift space-time-encoded symbol sequence.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate embodiments of the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent similar elements unless otherwise represented. The implementations set forth in the following description of exemplary embodiments consistent with the present invention do not represent all implementations consistent with the claimed invention. Instead, they are merely examples of systems and methods consistent with aspects related to the invention as recited in the appended claims.

Embodiments consistent with the present invention utilize shift space-time coding (SSTC) techniques for digital video broadcasting. These embodiments disclose a space-time coding technology with backward compatibility to a single-transmit antenna system for providing transmit diversity. The embodiments include a shifting space-time coding (SSTC) scheme developed by applying space-time block coding (STBC) over hierarchical modulation. Two separate bit streams can be carried by the SSTC scheme where one bit stream can be demodulated by conventional receivers without need for STBC decoding ability while the other can be demodulated by receivers capable of STBC decoding in order to gather the diversity gain. The SSTC scheme may be adopted by and applicable with Digital Video Broadcasting-Terrestrial (DVB-T), DVB-Handheld (DVB-H) and Integrated Services Digital Broadcasting-Terrestrial (ISDB-T) systems in order to improve either spectrum efficiency or transmission reliability.

Figure 4:
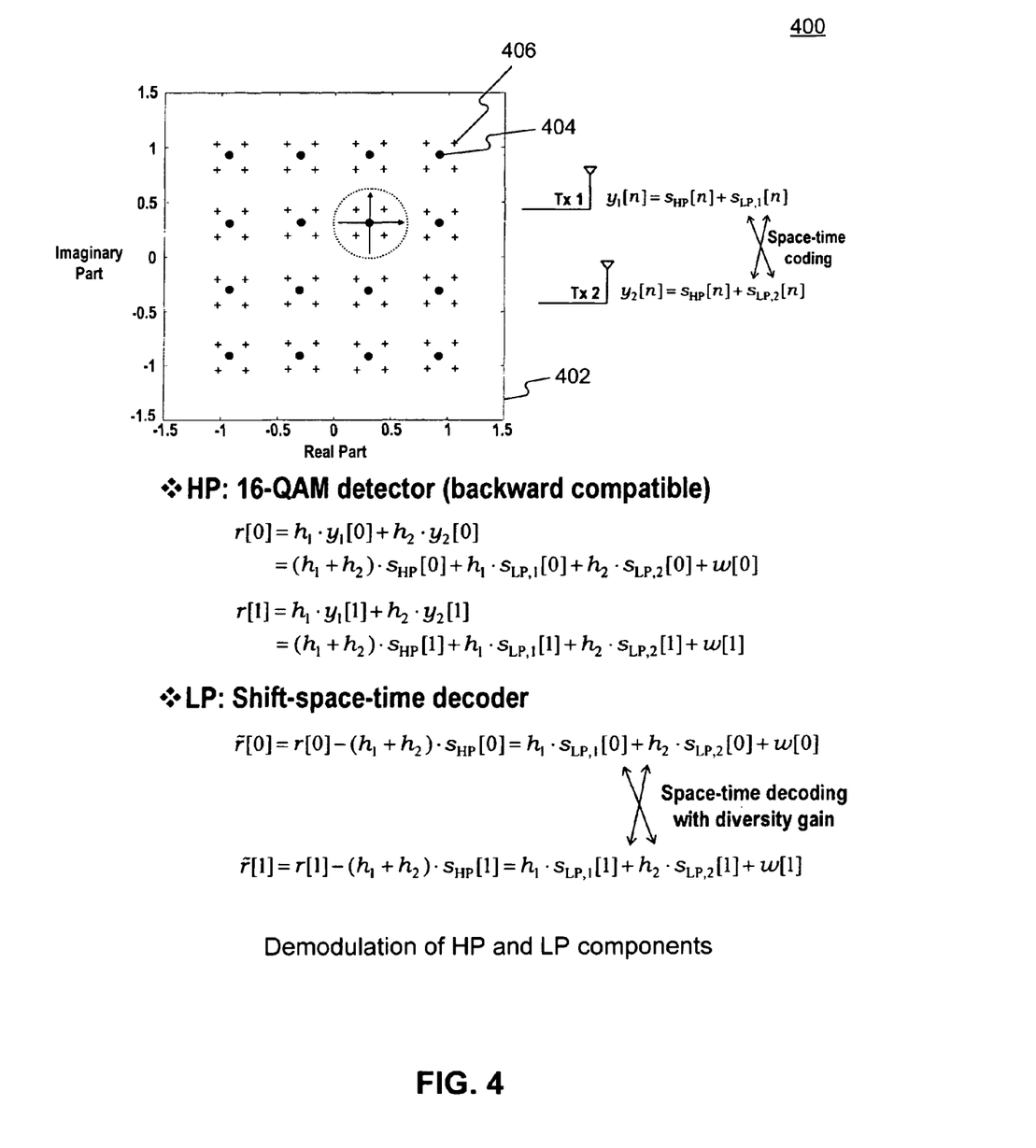
FIG. 4 illustrates a shift space-time coding (SSTC) scheme, consistent with the present invention.

FIG. 4 illustrates a shift space-time coding (SSTC) scheme 400 developed by applying STBC over hierarchical modulation. As part of FIG. 4, a hierarchical 64-QAM (Quadrature Amplitude Modulation) constellation 402 is depicted for describing the scheme. The hierarchical constellation 402 can be decomposed into a high-priority (HP) component and a low-priority (LP) component located on a grid, representing real and imaginary parts of the HP and LP components. The HP component may be represented as a 16-QAM constellation 404 (indicated by the dots), which is backward compatible (for existing receivers). The LP component may be represented as a QPSK constellation 406 (indicated by the "+" signs). As shown in 64-QAM constellation 402 of FIG. 4, the HP component (dots) is enclosed by the LP component ("+" symbols).

Two separate bit streams may be mapped into and carried by the two components, respectively. In particular, a bit stream of low-priority is modulated to complex symbols followed by STBC encoding. A bit stream of high-priority is modulated to complex symbols without STBC encoding. Next, complex symbols from the low-priority bit stream (i.e., LP component) together with those from the high-priority bit stream (i.e., HP component) are added to form hierarchical 64-QAM constellation 402.

Figure 5:
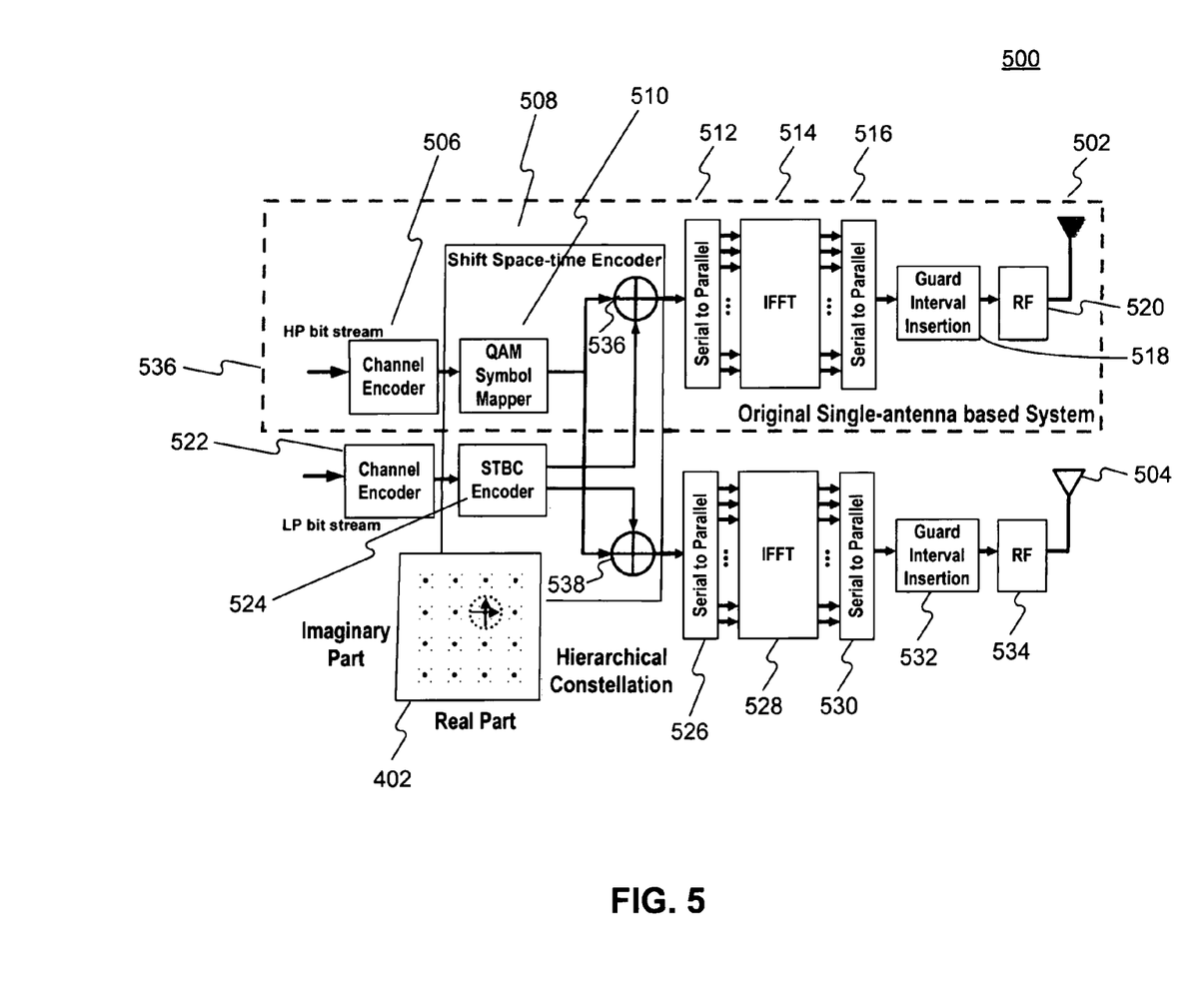
FIG. 5 illustrates an embodiment including two separate bit streams carried by the SSTC scheme, consistent with the present invention.

As illustrated in FIG. 5, two separate bit streams may be carried by an SSTC system 500 and jointly configured as two SSTC components. The two SSTC components are transmitted with two separate antennas 502, 504. For example, a high-priority bit stream HP may be input to a channel encoder 506. Channel encoder 506 may then provide a coded sequence to a QAM symbol mapper 510 (shown as part of a shift space-time encoder 508). The coded HP bit stream may then be mapped into a symbol sequence by QAM symbol mapper 510.

SSTC system 500 may further include an adder 536. Adder 536 may include a first input, receiving the QAM-modulated symbol sequence from QAM symbol mapper 510. Adder 536 may further receive a second input from STBC encoder 524 (as discussed below). Adder 536 may then supply a shift space-time-encoded symbol sequence through an output to a serial-to-parallel converter 512, which in turn supplies the symbol sequence to an Inverse Fast Fourier Transform (IFFT) block 514. The output from block 514 may then be converted from parallel to serial at a converter 516 and supplied to a guard interval insertion block 518. The resulting symbol sequence may then be supplied to an RF (radio frequency) circuit 520, for transmission by first antenna 502.

A low-priority bit stream LP may be input to a channel encoder 522. The LP bit stream may be mapped into complex symbols (e.g., by implementing PSK/QAM processing) followed by STBC encoding, at an STBC encoder 524 (also shown as part of shift space-time encoder 508).

SSTC system 500 may further include an adder 538. Adder 538 may include a first input, receiving the STBC encoded symbol sequence from STBC encoder 524. Adder 538 may further include a second input receiving the QAM-modulated symbol sequence from QAM symbol mapper 510. Adder 538 may then output a shift space-time-encoded symbol sequence to a serial-to-parallel converter 526, which in turn inputs the symbol sequence to an Inverse Fast Fourier Transform (IFFT) block 528. The output may then be converted from parallel to serial at a converter 530 and input to a guard interval insertion block 532. The resulting symbol sequence may then be supplied to an RF circuit 534, for transmission by second antenna 504.

In this scheme, one bit stream may be demodulated by conventional receivers without a need for STBC decoding ability. For example, demodulation for the HP bit stream may be achieved by a conventional QAM detector, which is backward compatible. Thus, the HP bit stream represents the original single-antenna based system 536, which in turns guarantees backward compatibility to existing receivers.

In addition, the LP bit stream may be demodulated by receivers capable of STBC decoding to gather the diversity gain. For example, the LP bit stream may be decoded by using a shift space-time decoder.

Figure 6:
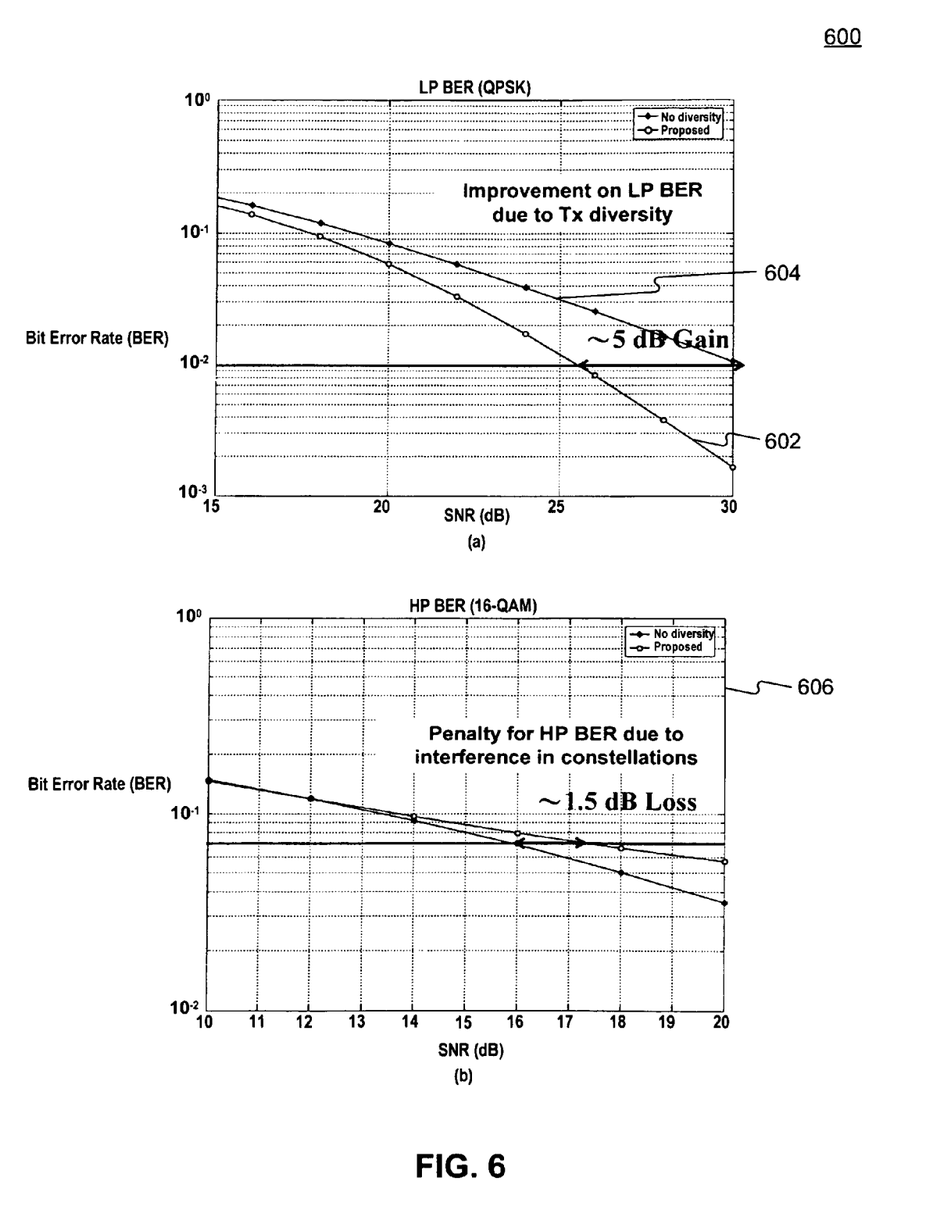
FIG. 6 illustrates a comparison of BER performance between the disclosed SSTC scheme and the conventional single-transmit antenna scheme, consistent with the present invention.

FIG. 6 illustrates simulation results in a graph 600 of the disclosed SSTC scheme in accordance with exemplary embodiments. Graph 600 reveals the bit error rate (BER) performance comparison between the disclosed SSTC scheme (lower curve 602) and the conventional single-transmit antenna scheme (upper curve 604). For example, graph 600 reveals that the disclosed SSTC scheme may provide above 5 dB gain for LP (low-priority) BER performance. A graph 606 shows a small penalty (about 1.5 dB loss) for HP (high-priority) performance.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art to which this invention and all within the limits of the appended claims. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A shift space-time coding (SSTC) system for digital broadcasting, the system comprising:
    a first SSTC component, comprising:
        a first channel encoder having an input receiving a high-priority bit stream and an output supplying a first channel-encoded bit stream;
        a QAM symbol mapper having an input receiving the first channel-encoded bit stream and an output supplying a QAM-modulated symbol sequence; and
        a first adder comprising:
            a first input receiving the QAM-modulated symbol sequence;
            a second input; and
            an output supplying a first shift space-time-encoded symbol sequence; and
    a second SSTC component, comprising:
        a second channel encoder having an input receiving a low-priority bit stream and an output supplying a second channel-encoded bit stream;
        an STBC encoder having an input receiving the second channel-encoded bit stream and two outputs supplying a first STBC-modulated symbol sequence to the second input of the first adder and a second STBC-modulated symbol sequence; and
        a second adder, comprising:
            a first input receiving the second STBC-modulated symbol sequence;
            a second input receiving the QAM-modulated symbol sequence; and
            an output supplying a second shift space-time-encoded symbol sequence.

2. A system as recited in claim 1, comprising a shift space-time encoder, the shift space-time encoder including the QAM symbol mapper, the STBC encoder, and the first and second adders.

3. The system of claim 1, wherein the high-priority bit stream is modulated using a 16-QAM constellation.

4. The system of claim 1, wherein the low-priority bit stream is modulated using a QPSK constellation.

5. The system of claim 1, wherein each of the two SSTC components contains both the information from the high-priority bit stream and the low-priority bit stream.

6. The system of claim 1, wherein two bit streams are mapped into and carried by the first SSTC component and the second SSTC component simultaneously.

7. The system of claim 6, wherein the high-priority bit stream is modulated to complex symbols without STBC encoding.

8. The system of claim 6, wherein the low-priority bit stream is modulated to complex symbols followed by STBC encoding.

9. The system of claim 7, wherein the high-priority bit stream is configured to be demodulated by conventional receivers.

10. The system of claim 9, wherein the high-priority bit stream is configured to be demodulated by a QAM detector.

11. The system of claim 10, wherein the QAM detector is backward compatible.

12. A method for providing shift space-time coding (SSTC) bit streams for digital broadcasting, the method comprising:
    receiving a high-priority bit stream;
    encoding the high-priority bit stream to form a first channel-encoded bit stream;
    mapping the first channel-encoded bit stream into complex symbols to form a QAM-modulated symbol sequence;
    receiving a low-priority bit stream;
    encoding the low-priority bit stream to form a second channel-encoded bit stream;
    performing STBC-encoding on the second channel-encoded bit stream to form a first STBC-modulated symbol sequence and a second STBC-modulated symbol sequence;
    adding the first STBC-modulated symbol sequence to the QAM-modulated symbol sequence to form a first shift space-time-encoded symbol sequence; and
    adding the QAM-modulated symbol sequence to the second STBC-modulated symbol sequence to form a second shift space-time-encoded symbol sequence.

13. The method of claim 12, further comprising:
    transforming the first shift space-time-encoded symbol sequence using inverse fast Fourier transformation;
    inserting guard intervals in the transformed first shift space-time-encoded symbol sequence; and
    transmitting the transformed first shift space-time-encoded symbol sequence and guard intervals over a first transmitter;
    transforming the second shift space-time-encoded symbol sequence using inverse fast Fourier transformation;
    inserting guard intervals in the transformed second shift space-time-encoded symbol sequence; and transmitting the transformed second shift space-time-encoded symbol sequence and guard intervals over a second transmitter.

14. The method of claim 12, further including modulating the high-priority bit stream using a 16-QAM constellation.

15. The method of claim 12, further including modulating the low-priority bit stream using a QPSK constellation followed by STBC encoding.

16. The method of claim 12, comprising inserting guard intervals in the transformed first shift space-time-encoded symbol sequence and in the transformed second shift space-time-encoded symbol sequence prior to transmission.

17. The method of claim 14, further including configuring the high-priority bit stream to be demodulated by conventional receivers.

18. The method of claim 14, further including configuring the high-priority bit stream to be demodulated by a QAM detector.

19. The method of claim 15, further including configuring the low-priority bit stream to be demodulated by receivers capable of STBC decoding.

* * * * *